United States Patent
Launay et al.

(10) Patent No.: US 7,046,835 B2
(45) Date of Patent: May 16, 2006

(54) METHOD AND SYSTEM FOR PROCESSING VASCULAR RADIOGRAPHIC IMAGES WHICH HAVE BEEN RECONSTRUCTED BY THREE-DIMENSIONAL MODELLING

(75) Inventors: Laurent Launay, Saint Remy les Chevreuse (FR); Fabienne Betting, Houston, TX (US); Jerome Knoplioch, Neuilly sur Seine (FR)

(73) Assignee: GE Medical Systems Global Technology Company LLC, Waukesha, WI (US)

( * ) Notice: Subject to any disclaimer, the term of this patent is extended or adjusted under 35 U.S.C. 154(b) by 615 days.

(21) Appl. No.: 10/091,946

(22) Filed: Mar. 7, 2002

(65) Prior Publication Data

US 2003/0169914 A1    Sep. 11, 2003

(51) Int. Cl.
*G06K 9/00*   (2006.01)

(52) U.S. Cl. ..................................... 382/132
(58) Field of Classification Search ............... 382/131, 382/154, 130, 128, 129; 328/309
See application file for complete search history.

(56) References Cited

U.S. PATENT DOCUMENTS

| | | | | |
|---|---|---|---|---|
| 5,415,163 A * | 5/1995 | Harms et al. | ............... | 600/410 |
| 5,644,646 A | 7/1997 | Du et al. | ............... | 382/128 |
| 5,832,134 A | 11/1998 | Avinash et al. | ............... | 382/257 |
| 6,073,042 A | 6/2000 | Simonetti | ............... | 600/420 |
| 6,112,109 A * | 8/2000 | D'Urso | ............... | 600/407 |
| 6,148,095 A | 11/2000 | Prause et al. | ............... | 382/131 |
| 6,195,450 B1 * | 2/2001 | Qian et al. | ............... | 382/130 |
| 6,283,918 B1 * | 9/2001 | Kanda et al. | ............... | 600/441 |
| 6,366,635 B1 * | 4/2002 | Op De Beek et al. | ............... | 378/4 |
| 6,541,024 B1 * | 4/2003 | Kadiyala et al. | ............... | 424/426 |
| 6,714,668 B1 * | 3/2004 | Kerrien et al. | ............... | 382/130 |
| 6,760,611 B1 * | 7/2004 | Watanabe | ............... | 600/410 |
| 6,839,457 B1 * | 1/2005 | Azuma et al. | ............... | 382/131 |
| 6,842,638 B1 * | 1/2005 | Suri et al. | ............... | 600/425 |
| 2002/0183607 A1 * | 12/2002 | Bauch et al. | ............... | 600/407 |

FOREIGN PATENT DOCUMENTS

| | | | |
|---|---|---|---|
| JP | 02063439 A | * | 3/1990 |
| WO | 0075872 | | 12/2000 |

OTHER PUBLICATIONS

DeLaere et al, "Knowledge-Based System for the Three-Dimensional Reconstruction of Blood Vessels From Two Angiographic Protections".
Medical and Biological Engineering and Computing Peter Peregenius Ltd, Stevenage GB, Nov. 1, 1991, pp. N527-N5-36.

* cited by examiner

*Primary Examiner*—Kanjibhai Patel
*Assistant Examiner*—O'Neal R. Mistry
(74) *Attorney, Agent, or Firm*—Cantor Colburn LLP

(57) ABSTRACT

Method and system for processing vascular radiography images which have been reconstructed by three-dimensional modelling, in which: from this three-dimensional modelling there is determined a three-dimensional model known as the masked model which features the calcified elements and the prosthetic elements, but not the vascular elements; a three-dimensional model known as the subtracted model, which features the vascular elements alone, is determined; these two models are merged, weighting their voxels so as to increase the contrast between the images of the masked model and the images of the subtracted model; and summing the voxels thus weighted.

19 Claims, 3 Drawing Sheets

FIG.4a  FIG.4b
FIG.5a  FIG.5b

METHOD AND SYSTEM FOR PROCESSING VASCULAR RADIOGRAPHIC IMAGES WHICH HAVE BEEN RECONSTRUCTED BY THREE-DIMENSIONAL MODELLING

CROSS-REFERENCE TO RELATED APPLICATIONS

The entire contents of French Patent Application No. 0100737 filed Jan. 19, 2001 are hereby incorporated by reference.

BACKGROUND OF THE INVENTION

The present invention is directed to a method and system for processing radiographic images which have been reconstructed by three-dimensional modelling. In particular, the present invention is applicable to vascular images which includes an implanted element, such as a prosthesis.

There are known numerous three-dimensional imaging methods and systems which take two-dimensional images obtained, for example, by X-ray fluoroscopy, to produce 3D models of an object, i.e., a patient that it is desired to observe. In particular, there are known 3D angiography systems which, by X-ray fluoroscopy, reconstruct 3D models of vessels on which a procedure is to be carried out, for example in order to treat arterial stenosis. In 3D angiography, there are three complementary types of image likely to be obtained, namely:

a reconstructed model known as a "subtracted" model, indicating the vascular elements ("lumens") alone, without the calcified elements and the endovascular prostheses;

a reconstructed model known as a "masked" model, identifying the calcified elements and the prostheses, but not the vascular elements; and a reconstructed model known as an "opacified" model, identifying the vascular elements, the calcified elements and the prostheses, but without it being very easy to distinguish the various elements, the image obtained being relatively difficult to interpret.

Techniques for producing these three types of modelled images, are described in French Patent Application No. 0011486.

BRIEF DESCRIPTION OF THE INVENTION

An embodiment of the invention is system and method for processing a vascular radiography image which has been reconstructed by three-dimensional modelling comprising:

(a) determine a three-dimensional model to be known as the masked model which features the calcified elements and an implanted element, but not vascular element;

(b) determine a three-dimensional model to be known as the subtracted model, which features the vascular element alone;

(c) merging the two models and weighting their voxels so as to increase the contrast between the image of the masked model and the image of the subtracted model; and (d) summing the voxels thus weighted.

BRIEF DESCRIPTION OF THE DRAWING

An embodiment of the invention will become further apparent from the description which follows, which is purely illustrative and non-limiting and is to be read with reference to the appended drawings in which:

FIGS. 4a and 4b illustrate a 3D model and a sectional view obtained from it, in the case of implementation of a method of one embodiment of the invention; and FIGS. 5a and 5b illustrate another exemplary embodiment.

DETAILED DESCRIPTION OF THE INVENTION

Figure 1:
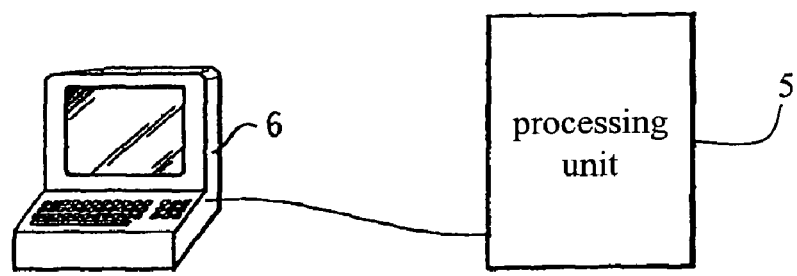
FIG. 1 schematically depicts a system for implementing a method according to an embodiment of the invention.

In this embodiment, it is assumed that there is available a set of two-dimensional angiography images obtained around a given anatomical region of a patient and from these images it is possible to reconstruct three-dimensional models of the anatomical region and, in particular, subtracted and masked three-dimensional models. These angiography images may, for example, be obtained by x-ray fluoroscopy, etc. The images are stored and processed in a processing unit 5, which is connected to interface means 6 which, in particular, allow the radiography images to be displayed (FIG. 1).

In an embodiment of the processing may be carried out in four successive steps.

Figure 2:
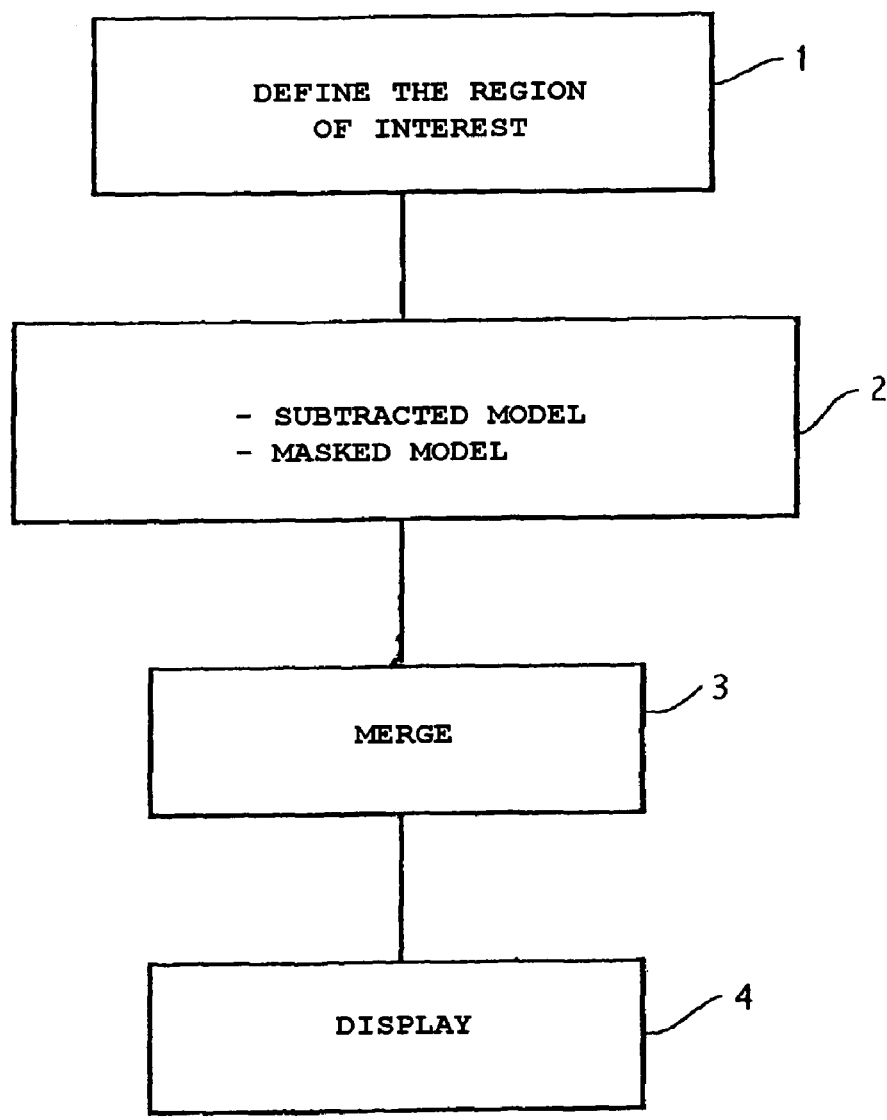
FIG. 2 is a flow diagram schematically illustrating the various steps in the processing in an embodiment of the invention.

In a first step (step 1 in FIG. 2), the user defines a volume which constitutes the region of interest. The region of interest will, in particular, preferably be defined so that it contains only a limited number of bones while at the same time fully including the portion or portions of blood vessel the user wishes to view, with any calcified elements or prosthesis they may have. In particular, the user may select, from a displayed 3D model the vessels to view and for the system to automatically determine the limits of these vessels. As an alternative, the user can make a selection by magnifying the delimited regions.

In a second step (step 2), the system automatically reconstructs the three-dimensional models which correspond to the subtracted reconstruction and the masked reconstruction for the selected region.

In a third step (step 3), the system performs a 3D merger processing operation on the two models thus obtained.

And finally, in a fourth step (step 4), the merged 3D image thus obtained is displayed on the interface means 6.

The merger of the two models is substantially meaningless unless the subtracted and masked 3D models have been obtained from the same angiographic acquisition and correspond to the same 3D frame of reference.

Figure 3:
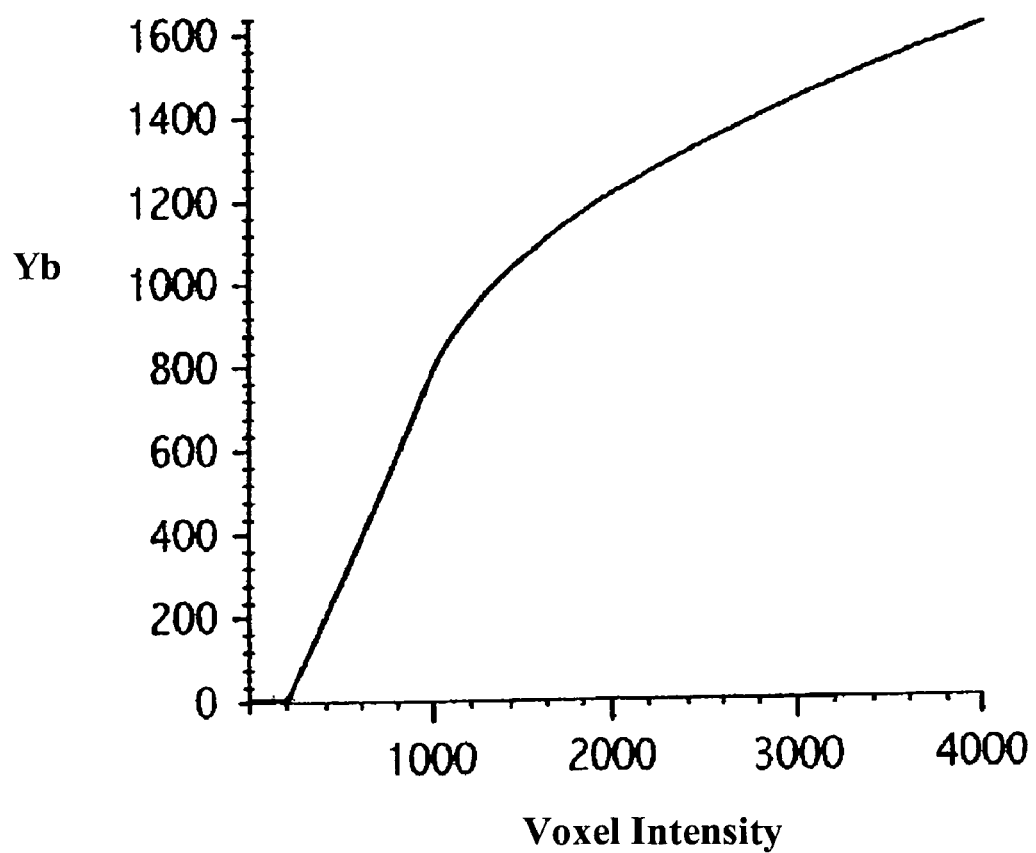
FIG. 3 is an example of a possible curve for one of the functions used in the processing.

The merger processing operation is performed voxel by voxel, calculating the intensity (attenuation coefficient, Mer (v) of a voxel v of the merged image using the formula:

$$\mathrm{Mer}(v) = V_0 \cdot \frac{\mathrm{Sub}(v)}{\mathrm{Mean}(\mathrm{Sub})} + a \cdot Y_b[\mathrm{Mask}(v)]$$

where:

v represents the coordinates of the voxel;

Sub(v) is the intensity (that is to say the attenuation coefficient) of the voxel v of the subtracted model;

Mask(v) is the intensity (that is to say the attenuation coefficient) of the voxel v of the masked 3D model;

Mean(Sub) is the mean intensity calculated either over the entire volume considered, or vessel by vessel—using automatic determination of the limits of the vessels or vessel portion per vessel portion, or alternatively still, along straight-line portions which constitute the main directions of the vessel;

$V_0$ is a predetermined constant which represents the "desired" mean intensity for the depiction of the vessel in the merged image;

a is a constant of predetermined value which has a value higher than 1 (for example 10) so as to increase the contrast between the structures present in the unsubtracted model (vascular prosthesis, calcification, etc.) with respect to the blood vessels;

$Y_b$ is a one-dimensional function which is, for example, a linear straight line, but which may be a more complicated function (c.f. FIG. 3) which depends on a threshold value b and comprises three parts:

$Y_b$ is zero in the interval [0,b];

$Y_b$ varies linearly between b and a value $b+b_0$, the linearity coefficient being equal to 1;

$Y_b$ is, in the interval $[b+b_0; +\infty]$, a function which increases less markedly than the linear function of intensity used between b and $b+b_0$; this function is for example the $\sqrt{}$ function adjusted to ensure continuity of the first-order derivative of the function $Y_b$, this third part making it possible to avoid the effects of saturation when highly absorbent metal elements are present in the masked image.

The role of the threshold b is to eliminate the ambient noise present in the reconstructed or subtracted model before increasing its contrast.

One possible robust automatic estimate of this threshold is obtained as follows:

calculating a smoothed histogram of the masked model, and doing so over the selected region for treatment, smoothing being achieved by taking a mean over a smoothing window of a predetermined size and, determining the minimum value of the first-order derivative of this histogram, the intensity thus obtained being the threshold b.

Multiplying by the coefficient "a" is advantageously not performed until after filtering has been performed using the threshold b.

Examples of merged images obtained in the way which has just been described are given in FIGS. 4a and 4b, and in 5a and 5b. The images in FIGS. 4a and 4b being, respectively, views in section and perspective revealing calcifications around the vesselsl. The images of FIGS. 5a and 5b being, respectively, views in section and perspective revealing vascular prosthesis (stents). Merged three-dimensional images in which the calcifications and the protheses show up particularly clearly are thus available. The calcifications or the stents show up particularly clearly in these images, making them easier to interpret.

Of course, it is possible for the user, during the procedure, to alter certain parameters and in particular to modify the parameters b and a to adjust the contrasts of the various merged parts and control the brightness of the unsubtracted images.

Images thus obtained are similar to those that can be obtained by CT angiography. A two-colour depiction may also be envisaged.

Various modifications in structure and/or steps and/or function may be made by one skilled in the art without departing form the scope and extent of the invention as recited in the claims.

What is claimed is:

1. A method for processing radiography images comprising:
   determine from a three-dimensional modelling a three-dimensional model known as the masked model which features a calcified element and an implanted element, but not a vascular element;
   determine a three-dimensional model known as the subtracted model, which features the vascular elements alone;
   merging the two models, weighting their voxels so as to increase the contrast between the images of the masked model and the images of the subtracted model, and summing the voxels thus weighted;
   wherein the voxels of the masked image are weighted by applying to them a function rule which, over at least one range of voxel intensities, is a linear function of the intensity, and which, outside of the voxel intensity range, increases less markedly than the linear function of intensity used for the intensity range.

2. The method according to claim 1, wherein the masked image is filtered by removing therefrom any voxel intensities which are below a given threshold.

3. The method according to claim 2, wherein the weighting is applied to the voxels after filtering.

4. The method according to claim 1, wherein the function rule used outside of the intensity range is a function which, give or take a multiplication factor, corresponds to the square root function.

5. The method according to claim 1 wherein the voxels of the subtracted model are weighted by applying to them a coefficient which is the ratio between a value that corresponds to a desired mean value for the voxels of the model in the merged model and a mean value that is calculated over the voxels in the subtracted model.

6. The method according to claim 5, wherein the mean value is calculated by determining the limits of the vessels or vessel portions and by calculating the mean value in the region thus determined.

7. The method according to claim 5, wherein the mean value is calculated by determining portions of straight lines which constitute the main directions of a vessel and by calculating the mean value over those straight lines portions.

8. The method according to claim 1 wherein the anatomical region that it is desired to view is selected beforehand, the masked model and the subtracted model and the merged model being determined for the region.

9. The method according to claim 8, wherein the merged model is produced by pointing to the portion or portions of vessels that the user wishes to view and automatically determining the limits of this or these portion or portions of vessels.

10. The method of claim 1, wherein:
    the masked model comprises a radiographic masked model; and
    the subtracted model comprises a radiographic subtracted model.

11. An apparatus for radiographic imaging comprising:
    means for providing a three-dimensional model to be known as the masked model showing a calcified element and an implanted element, but not a vascular element;
    means for providing a three-dimensional model to be known as the subtracted model showing the vascular elements alone;

means for merging the two models and weighting their voxels so as to increase the contrast between the image of the masked model and the image of the subtracted model; and summing the voxels thus weighted;

wherein the voxels of the masked image are weighted by applying to them a function rule which, over at least one range of voxel intensities, is a linear function of the intensity, and which, outside of the voxel intensity range, increases less markedly than the linear function of intensity used for the intensity range.

12. The apparatus according to claim 11 comprising:

means for filtering the masked image to remove therefrom any voxel intensities which are below and given threshold.

13. The apparatus according to claim 12 wherein the weighting is applied to the voxels after filtering.

14. The apparatus according to claim 11 wherein the function rule used outside of the intensity range is a function which, give or take a multiplication factor, corresponds to the square root function.

15. The apparatus according to claim 11 wherein the voxels of the subtracted model are weighted by applying to them a coefficient which is the ratio between a value that corresponds to a desired mean value for the voxols of the model in the merged model and a mean value that is calculated over the voxels in the subtracted model.

16. The apparatus according to claim 15 wherein the mean value is calculated by determining the limits of the vessels a vessel portions and by calculating the mean value in the region thus determined.

17. The apparatus according to claim 15 wherein the mean value is calculated by determining portions of straight lines which constitute the main directions of a vessel and by calculating the mean value over these straight lines portions.

18. The apparatus according to claim 11 wherein the anatomical region that it is desired to view is selected beforehand, the masked model and the subtracted model and the merged model being determined for the region.

19. The apparatus according to claim 18 wherein the merged model is produced by pointing to the portion or portions of vessels tat the user wishes to view and automatically determining the limits of this or these portion or portions of vessels.

* * * * *